United States Patent [19]

Berrier et al.

[11] Patent Number: 4,680,330

[45] Date of Patent: Jul. 14, 1987

[54] STRETCHABLE CLING FILM COMPOSITION BASED ON POLYETHYLENE

[75] Inventors: Bernard Berrier, Chateauneuf les Martigues; Jean P. Thiersault, Ville D'Avray, both of France

[73] Assignee: BP Chemicals Limited, London, England

[21] Appl. No.: 807,975

[22] Filed: Dec. 12, 1985

[30] Foreign Application Priority Data

Dec. 28, 1984 [FR] France .................. 84 19979

[51] Int. Cl.$^4$ .............. C08K 5/01; C08K 5/20; C08L 23/00; C08L 91/06

[52] U.S. Cl. ................ 524/230; 524/275; 524/480; 524/481

[58] Field of Search ........... 524/481, 480, 230, 275

[56] References Cited

U.S. PATENT DOCUMENTS

| | | | |
|---|---|---|---|
| 3,969,562 | 7/1976 | Suzuki | 428/141 |
| 4,031,162 | 6/1977 | Brax et al. | 525/239 |
| 4,064,296 | 12/1977 | Bornstein et al. | 428/35 |
| 4,087,505 | 5/1978 | Sugimoto et al. | 525/216 |
| 4,179,081 | 12/1979 | Parry | 53/390 |
| 4,230,767 | 10/1980 | Isaka et al. | 428/349 |
| 4,293,608 | 10/1981 | Isaka et al. | 428/220 |
| 4,327,009 | 4/1982 | Allen et al. | 524/114 |
| 4,359,497 | 11/1982 | Magder et al. | 428/141 |
| 4,472,328 | 9/1984 | Sugimoto et al. | 524/481 |

FOREIGN PATENT DOCUMENTS

| | | |
|---|---|---|
| 0011930 | 6/1980 | European Pat. Off. . |
| 2445608 | 3/1975 | German Democratic Rep. . |
| 2003487 | 3/1979 | United Kingdom . |

*Primary Examiner*—Joseph L. Schofer
*Assistant Examiner*—N. Sarofim
*Attorney, Agent, or Firm*—Brooks, Haidt, Haffner & Delahunty

[57] ABSTRACT

The invention relates to a composition suitable for the manufacture of cling film, comprising 80 to 99% by weight of at least one polymer or copolymer of ethylene having a density less than or equal to 0.935, and from 1 to 20% by weight of the total composition comprising:

(a) A cling agent chosen from amongst liquid polybutenes and atactic polypropylenes and (b) At least one crystalline wax in a quantity of 0.01 and 50% by weight based on the weight of (a) and (b) together.

7 Claims, No Drawings

STRETCHABLE CLING FILM COMPOSITION BASED ON POLYETHYLENE

The present invention relates to stretchable cling film compositions based on ethylene (co)polymer, and to films produced therefrom.

The preparation of plastic films having cling and stretch properties at ambient temperature is already known, the compositions from which such films are fabricated comprising a polymer or copolymer of ethylene, and a cling agent. The polymer or copolymer of ethylene used in these compositions is generally selected from amongst low density polyethylenes and copolymers of ethylene and vinyl esters obtained by the free radical catalysed polymerisation of ethylene or copolymerisation of ethylene and vinyl ester, linear low density polyethylene obtained by the copolymerisation of ethylene and at least one other alpha-olefin by means of a Ziegler-type catalyst system or a Phillips-type catalyst system, or else mixtures of two or more of these polymers or copolymers of ethylene. The cling-agent, i.e. the agent providing the film with self-adhesive properties, used in these compositions is generally selected from copolymers of ethylene and propylene and the elastomer type, liquid polybutenes, polyisobutenes, atactic polypropylenes, or amorphous hydrocarbon polymers, generally consisting of hydrogenated polycyclic resins, such as the resins obtained by hydrogenation of polycyclopentadiene, polyterpene or coumarin/indene.

The cling films produced from such compositions desirably have stretch characteristics and mechanical properties, for example elongation at break, tearing strengths and breaking strengths permitting stretching at ambient temperature. Moreover, these films should have good cling properties, and should be capable of being used in automated packaging operation.

However, it is observed that films produced from such compositions generally have two main disadvantages. The first of these resides in the greasy surface qualities of these films, especially when the cling agent is polybutene or polyisobutene. The greasy surface quality may disturb the performance of automated packaging operations, and may also cause a deterioration in the packaged objects. The second disadvantage shown by these compositions resides in a considerable drop in cling properties, i.e. adhesion or resistance to detachment of the films, when the ambient temperature rises. This disadvantage becomes particularly severe when articles wrapped in the film are subject to heating or are stored or transported to countries where the ambient temperature is relatively high.

To reduce or eliminate the greasy surface quality of these films, it has been proposed to add monoglycerides and/or diglycerides of fatty acids to the cling film compositions. It is found that the films obtained in fact have a better surface appearance, but their cling performance is appreciably reduced.

It is an object of the present invention to provide improved compositions for manufacturing stretchable cling film.

Accordingly the present invention provides a composition based on ethylene polymer suitable for the manufacture of stretchable cling film, characterised in that the composition comprises from 80 to 99% by weight of at least one polymer or copolymer of ethylene having a density less than or equal to 0.935 and a total of from 1 to 20% by weight, based on the total composition, of components (a) and (b) comprising
(a) at least one cling agent selected from polybutene, polyisobutene and atactic polypropylene and
(b) at least one crystalline wax having one or more melting points (as measured by differential scanning calorimetry) between 50° and 200° C. and a number average molecular weight between 250 and 15000 and wherein the quantity of the crystalline wax lies in the range 0.01 to 50% by weight of the total weight of (a) and (b) together.

The polymer or copolymer of ethylene employed in the compositions according to the present invention may be chosen from amongst a wide variety of polymers. For example, they can be polyethylenes of low density, preferably comprised between 0.920 and 0.930, obtained by free radical polymerisation of ethylene, or copolymers of ethylene and a vinyl carboxylate ester or an alkyl ester of an unsaturated carboxylic acid obtained by free radical copolymerisation. The carboxylate part of the vinyl carboxylate ester is preferably derived from an aliphatic, saturated carboxylic acid having from 2 to 30 carbon atoms. Examples of suitable comonomers include vinyl propionate, vinyl hexanoate, vinyl octanoate, vinyl behenate, isopropenyl acetate, ethyl acrylate and butyl acrylate. Vinyl acetate is preferred.

These copolymers preferably contain at least 89% by weight and most preferably from 91 to 95% by weight of ethylene, their density preferably being in the range 0.917 and 0.933. They can be obtained for example by copolymerising ethylene and the comonomer under conventional high temperature, high pressure conditions.

The polymer or copolymer of ethylene used in the composition according to the present invention is preferably linear low density polyethylene obtained by copolymerising ethylene and at least one other alpha-olefin, in the presence of a Ziegler-type catalyst system or a Phillips type catalyst. Examples of linear low density polyethylenes are copolymers of ethylene and another alpha-olefin which can comprise from 3 to 12 carbon atoms, such as propylene, 1-butene, 1-hexene, 4-methyl-1-pentene, and 1-octene, or terpolymers of ethylene, propylene or 1-butene, and another alpha-olefin having from 5 to 12 carbon atoms. These linear low density polyethylenes generally contain from 80 to 98%, preferably from 85 to 97% by weight of ethylene, and have a density between 0.880 and 0.935, preferably between 0.900 and 0.930. They may be produced, for example, by copolymerisation at a pressure below 6 MPa, especially between 0.1 and 5 MPa, either at a temperature between about 40° and 110° C. in an inert liquid hydrocarbon medium in which the copolymer produced is in suspension, or at a temperature between about 110° and 300° C. in an inert liquid hydrocarbon in which the copolymer is produced in solution.

However, it is preferred to employ linear low density polyethylene prepared by copolymerising ethylene and at least one other alpha-olefin in a gas-fluidised bed, using a Ziegler type catalyst system comprising as catalyst a halogenated compound of a transition metal belonging to Groups IV, V or VI of the Periodic Table of Elements, and as co-catalyst an organo metallic compound of a metal belonging to Groups I to III of this Table. Such Ziegler-type catalyst systems are well known in the art.

Also suitable for use as the ethylene copolymer are linear low density polyethylenes prepared by the copolymerisation of ethylene and at least one other alpha-olefin using as catalyst, chromium oxide supported on a refractory oxide and active by thermal treatment e.g. catalysts of the well-known Phillips type. The copolymerisation can be carried out under solution, slurry or gas phase conditions.

In the compositions according to the present invention, two or more of the defined polymers or copolymers of ethylene such as those mentioned above may be used simultaneously in admixture. Thus, for example, one may use a mixture consisting of a low density polyethylene or a copolymer of ethylene and vinyl ester of a saturated carboxylic acid or alkyl ester of an unsaturated carboxylic acid, and a linear low density polyethylene, the mixture containing for example 10 to 99% by weight, and preferably 60 to 99% by weight of linear low density polyethylene.

The polymers or copolymers of ethylene employed in the composition of the present invention suitably have a melt index ($MI_{2.16}$) measured at 190° C. under a 2.16 kg load between 0.1 and 10 g/10 minutes, preferably between 0.2 and 5 g/10 minutes. They suitably have a molecular weight distribution between 2 and 15 and preferably between 3 and 8, the distribution being calculated by the ratio of the weight average molecular weight Mw to the number average molecular weight Mn determined by gel permeation chromatography. They preferably have a low parameter n between 15 and 400, most preferably between 20 and 200, n being the ratio of the melt index $MI_{21.6}$ measured at 190° C. under a 21.6 kg load to the melt index $MI_{2.16}$. By differential scanning calorimetry, after post-curing at 200° C., maintenance at this temperature for 20 minutes, cooling at a rate of 16° C. per minute and heating at a rate of 16° C. per minute, the polymers or copolymers of ethylene used in the compositions according to the present invention preferably have one or more melting points between 100° and 130° C., preferably between 110° and 128° C., and most preferably a single melting point comprised between 115° C. and 123° C., corresponding to a crystalline phase having a special distribution of the crystallite dimensions. This melting point or points is preferably accompanied by a melting range spread between approximately 100° and 120° C., corresponding to a relatively large amorphous phase. The fusion enthalpy of the polymers or copolymers of ethylene employed in the composition of the present invention is preferably between 40 and 170 J/g, most preferably between 60 and 120 J/g. Their degree of crystallinity, deduced from the measurements of fusion enthalpy, can be, for example, between 15 and 60%, preferably between 20 and 45%.

The compositions based on ethylene polymer according to the present invention comprise from 1 to 20% by weight of components (a) and (b) consisting of at least one cling agent (a) and at least one crystalline wax (b). A content of (a)+(b) of less than 1% by weight would not impart the desired cling properties to the films obtained from such compositions. On the other hand a content of over 20% by weight would deleteriously affect the mechanical properties of the films. The content by weight is preferably comprised between 2 and 15% by weight when the cling agent is a polybutene or polyisobutene and between 5 and 20% when the cling agent is atactic polypropylene.

The polybutene can, for example, be produced by cationic polymerisation of 1-butene or 2-butenes or of a mixture of 1-butene and 2-butenes, or by copolymerisation of isobutene with 1-butene and/or 2-butenes, especially by means of a Friedel-Crafts type catalyst, such as aluminium trichloride, boron trifluoride, tin or titanium tetrachlorides. One may also use a polyisobutene produced by polymerising isobutene by means of a cationic catalyst.

The polybutenes or polyisobutenes which are suitable for preparing the compositions according to the invention have a number average molecular weight between 500 and 10000, preferably between 700 and 5000. By way of example, polybutenes sold by BP CHIMIE under the trade names NAPVIS D 3 ®, NAPVIS D 10 ®, NAPVIS D 30 ®, NAPVIS D 200 ® or mixtures thereof may be employed. These also have a viscosity at 100° C. comprised between 10 and $10^6$ centistokes, preferably comprised between 50 and $5 \times 10^4$ centistokes, this viscosity being measured according to the NF-T-60100 or the ASTM-D-445 standards.

It is also possible to employ atactic polypropylene as a cling agent. Atactic polypropylene or copolymers of propylene and ethylene having a density comprised between 0.85 and 0.91, a weight average molecular weight between 500 and 50000, preferably between 1000 and 10000, and more especially between 1000 and 5000, and showing a complete absence of crystallinity as determined by differential scanning calorimetric analysis are particularly suitable.

The presence of crystalline wax in the compositions according to the invention improves the cling properties of the films obtained from these new compositions and also preserves or improves the excellent mechanical properties of these films.

The proportion of crystalline wax is between 0.01 and 50% by weight and preferably between 0.1 and 10% by weight of the total amount of the cling agent and the crystalline wax. Too low a proportion of crystalline wax would not impart improved cling properties to these films, especially at a relatively high ambient temperature, nor reduce or eliminate the greasy surface quality of these films. On the other hand, too large a proportion of crystalline wax would reduce the cling properties of the films.

By differential scanning calorimetry (DSC), after post-curing at 200° C., maintenance at this temperature for 20 minutes, cooling at a rate of 16° C. per minute and heating at a rate of 16° C. per minute, the crystalline waxes employed in these compositions according to the invention preferably have one or more melting points being 50° and 200° C., most preferably between 60° and 160° C. Such crystalline waxes possess a crystalline phase having a distribution of the crystallite dimensions which is particularly well suited to the nature of the ingredients of the compositions according to the invention. The fusion enthalpy of this crystalline wax is generally comprised between 60 and 300 J/g, preferably comprised between 80 and 200 J/g.

The crystalline waxes suitable for preparing the compositions according to the invention preferably have a number average molecular weight measured by osmometry or by gel permeation chromatography, between 250 and 15000, most preferably between 300 and 10000, and more especially between 300 and 5000.

These crystalline waxes may be chosen from amongst a wide variety of waxes including both natural and synthetic waxes. Amongst the natural waxes one may employ animal waxes such as beeswax; vegetable waxes such Carnauba, the principal constituent of which is the ester of cerotic acid and myricyl alcohol, having a molecular weight of 830; paraffin waxes of petroleum origin isolated from waxy distillate, appearing under microscopic examination in the form of long needles; and also microcrystalline waxes of petroleum origin separated from distillation residues by means of solvents, appearing under microscopic examination in the form of small irregular slightly elongated crystals.

Amongst synthetic waxes one may use, for example, microcrystalline waxes obtained by Fischer-Tropsch synthesis, having number average molecular weight generally between 400 and 1000, waxes of high density polyethylene or of low density polyethylene obtained by direct polymerisation of ethylene or by degradation of high molecular weight polyethylene, these polyethylene waxes having number average molecular weights between 300 and 15000, preferably between 400 and 5000, hydrogenated castor oil waxes whose main component is the triglyceride of hydrogenated ricinoleic acid of molecular weight 938, or waxes consisting of aliphatic amides of high molecular weights, having for example a melting point of about 145° C.

The compositions according to the invention may be prepared by known methods of blending or mixing, for example using a Banbury-type mixer, a tilting drum, a continuous or batch mixer or a single-screw or twin-screw extruder. The compositions can also be made by pre-mixing the cling agent with the crystalline wax at a temperature close to the melt temperature of the crystalline wax or above it, the mixture thus obtained occurring at ambient temperature (20° C.) in the form of a gel. This pre-mix can be blended or mixed with the polymer or copolymer of ethylene, to obtain compositions according to the invention, either at ambient temperature, or at a temperature of 50° to 200° C. If desired, one may add to the compositions according to the invention additives normally employed with polymers or copolymers of ethylene, such as antioxidant, stabilising agent, compounds absorbing ultra-violet radiation, antistatic agents, dyes or pigments.

Single-layer or multi-layer stretchable cling films may be obtained from compositions according to the invention by extrusion-blowing using an annular die and at a temperature generally comprised between 180° and 280° C., with a blow-up ratio which may for example between 1.5 and 4. Films may also be obtained by extrusion-casing through a slot die, in this case the surface of the film in contact with the chill roll generally having stronger cling properties. The films may have a thickness for example between 10 and 150 microns approximately. They have non-greasy surface qualities and good cling properties (high resistance to detachment), these properties being relatively insensitive to temperature. The films also possess excellent mechanical properties.

The resistance to detachment of the films, characterising the cling, is determined by using test pieces prepared by placing together strips of film 5 cm wide, over a length of 3 cm, (i.e. a surface area of 15 cm$^2$) and under a pressure of 830 g/cm$^2$ for 30 minutes. These test pieces are then subjected to a drawing force at a rate of 250 millimeters per minute, the distance between jaws initially being 50 millimeters. The force of drawing necessary for detachment is measured (in Newtons) and also the elongation (in millimeters) of the test piece before the two strips separate.

The tearing resistance of the films is measured in the machine direction and the transverse direction determined according to the ASTM-D-1922 standard and expressed in grams for films 25 microns thick.

The invention is illustrated by the following Examples:

EXAMPLE 1

A cling film composition (A) is obtained by mixing:
(a) 96.5% by weight of a linear low density polyethylene, obtained by copolymerising ethylene and 1-butene under gas fluidised bed conditions, having a content by weight of units derived from 1-butene of 7.5%, a density of 0.918 (at 20° C.), a melt index (MI$_{2.16}$) of 0.9, a flow parameter (n) of 25, a molecular weight distribution (Mw/Mn) of 4.5, a single melting point determined by differential calorimetric analysis of 123° C. and a fusion enthalpy of 96 J/g;
(b) 3.5% by weight of a mixture consisting of 99% by weight of a polybutene sold by BP CHIMIE under the trade name NAPVIS D 30 ®, having a number average molecular weight of 1350 and a viscosity at 100° C. of 650 centistokes, and 1% by weight of a crystalline wax obtained by Fischer-Tropsch synthesis solid by SASOL (South Africa), under the trade name SASOLWAX H2 ®. This crystalline wax has a number average molecular weight of 600 determined by osmometry, two melting points determined by DSC of 78° and 103° C. and a fusion enthalpy of 193 J/g.

To the composition (A) are added:
0.1% by weight of calcium stearate
0.02% by weight of an antioxidant of the hindered phenol type sold by CIBA-GEIGY under the trade name IRGANOX 1076 ® and 0.08% by weight of a stabilising agent sold by CIBA-GEIGY under trade name IRGAFOS 168 ®.

Films 35 microns thick are produced from this composition by extrusion-blowing using an annular die. The characteristics of the films are evaluated after a period of 24 hours. The results summarised in Table I show that the films obtained from composition (A) have non-greasy surface qualities and have both excellent cling properties at 23° C., characterised by high values of their resistance to detachment and their elongation before break, and very satisfactory mechanical properties.

EXAMPLE 2

(Comparative)

Composition (B) is identical to composition (A) described in Example 1, except that crystalline wax is not used. Composition (B) has calcium stearate, IRGANOX 1076 ® added to it in the same proportions as for composition (A).

Films are produced as in Example 1. The results, summarised in Table I, show that the films obtained from composition (B) have greasy surface qualities and have mediocre cling at 23° C., characterised by relatively low values for their resistance to detachment and their elongation before break.

EXAMPLE 3

(Comparative)

Composition (C) is obtained by mixing:
(a) 95.75% by weight of a linear low density polyethylene identical to that used in an Example 1.
(b) 3.5% by weight of a polybutene identical to that used in Example 1.

(c) 0.75% by weight of a product containing mono glycerides and diglycerides of oleic acid sold by ATLAS CHEMICAL (France) under the trade name ATMER 121 ®.

Composition (C) has calcium stearate, IRGANOX 1076 ® and IRGAFOS 168 ® added to it in the same proportions as composition (A) of Example 1. Films are produced as in Example 1.

The results, summarised in Table I, show that the films obtained from composition (C) have non-greasy surface qualities but have mediocre cling properties at 23° C., characterised by relatively low values for their resistance to detachment and their elongation before break.

EXAMPLE 4

Composition (D) is obtained by mixing:
(a) 96.5% by weight of a linear low density polyethylene obtained by gas fluidised bed copolymerisation of ethylene and 1-butene, having a content by weight of units derived from 1-butene of 5.5%, a density of 0.928 (at 20° C.), a melt index ($MI_{2.16}$) of 4.2, a flow parameter (n) of 22, a MWD ($M_w/M_n$) of 3.2, a single melting point determined by DSC of 126° C. and a fusion enthalpy of 125 J/g.
(b) 3.5% by weight of a mixture consisting of 99% by weight of a polybutene identical to that used in Example 1 and 1% by weight of a crystalline wax identical to that used in Example 1.

Composition (D) has calcium stearate, IRGANOX 1076 ® and IRGAFOS 168 ® added to it in the same proportions as to composition (A) in Example 1.

Films are produced as in Example 1. The results, summarised in Table I, show that the films obtained from composition (D) have non-greasy surface qualities and have both excellent cling properties at 23° C., characterised by high values for their resistance to detachment and elongation before break, and very satisfactory mechanical properties.

EXAMPLE 5

(Comparative)

Composition (E) is identical to composition (D) described in Example 4, except for the fact that it does not contain any crystalline wax.

Composition (E) has calcium stearate, IRGANOX 1076 ® and IRGAFOS 168 ® added to it in the same proportions as in composition (A) of Example 1.

Films are produced as in Example 1. The results, summarised in Table I, show that the films obtained from composition (E) have greasy surface qualities and have mediocre cling properties at 23° C., characterised by relatively low values for their resistance to detachment and their elongation before break.

EXAMPLE 6

(Comparative)

Composition (F) is obtained by mixing:
(a) 95.75% by weight of a linear low density polyethylene identical to that used in Example 4.
(b) 3.5% by weight of a polybutene identical to that used in Example 1.
(c) 0.75% by weight of a product comprising mono glycerides and diglycerides of oleic acid, identical to that used in Example 3.

Composition (F) has calcium stearate, IRGANOX 1076 ® and IRGAFOS 168 ® added to it in the same proportions as in composition (A) of Example 1.

Films are produced as in Example 1. The results, summarised in Table I, show that the films obtained from composition (F) have non-greasy surface qualities but have mediocre cling properties at 23° C., characterised by relatively low values for their resistance to detachment and their elongation before break.

EXAMPLE 7

Composition (G) is obtained by mixing:
(a) 96.5% by weight of a linear low density polyethylene identical to that used in Example 1.
(b) 3.5% by weight of a mixture consisting of 99% by weight of a polybutene sold by BP Chimie (France) under trade name NAPVIS D 10 ®, having a number average molecular weight of 970 and a viscosity at 100° C. of 220 centistokes and 1% by weight of a crystalline wax identical to that used in Example 1.

Composition (G) has calcium stearate, IRGANOX 1076 ® and IRGAFOS 168 ® added to it in the same proportions as in composition (A) of Example 1.

Films are produced as in Example 1. The results, summarised in Table II, show that the films obtained from composition (G) have very good cling properties at 23° C. and good cling properties at 50° C.

TABLE I

| Example | Composition | Resistance to detachment at 23° C. (N) | Elongation before break at 23° C. (mm) | Surface quality | Resistance to tearing (film 25 mm thick) machine direction (g) | Resistance to tearing (film 25 mm thick) transverse direction (g) |
|---|---|---|---|---|---|---|
| 1 | (A) | 21.1 | 191 | non-greasy | 136 | 400 |
| 2 (Comparative) | (B) | 20.3 | 165 | greasy | 140 | 360 |
| 3 (Comparative) | (C) | 15.7 | 104 | non-greasy | 230 | 480 |
| 4 | (D) | 20.2 | 182 | non-greasy | 130 | 400 |
| 5 | (E) | 19.3 | 154 | greasy | 140 | 360 |
| 6 (Comparative) | (F) | 15.5 | 98 | non-greasy | 280 | 470 |

TABLE II

| Example | Composition | Resistance to detachment at 23° C. (N) at 23° C. | Resistance to detachment at 23° C. (N) at 50° C. | Elongation before break (mm) at 23° C. | Elongation before break (mm) at 50° C. |
|---|---|---|---|---|---|
| 7 | (G) | 19.3 | 12.2 | 183 | 129 |

We claim:

1. A composition based on ethylene polymer and suitable for the manufacture of stretchable cling film characterised in that the composition comprises from 80 to 99% by weight of at least one homopolymer or copolymer of ethylene having a density less than or equal to 0.935, and a total of from 1 to 20% by weight, based on the total composition of components (a) and (b) comprising
- (a) at least one cling agent selected from liquid polybutene, polyisobutene having a number average molecular weight in the range 500 and 10000 and an atactic polypropylene having a weight average molecular weight in the range 500 and 50000, and
- (b) at least one crystalline wax having one or more melting points, (as determined by differential scanning calorimetry) between 50° and 200° C. and a number average molecular weight between 250 and 15000 and wherein the quantity of the crystalline wax lies in the range 0.1% to 10% by weight of the total weight of (a) and (b) together.

2. A composition according to claim 1, characterised in that the polymer or copolymer of ethylene has a melt index, measured at 190° C. under a 2.16 kg load, in the range 0.1 and 10 g/10 minutes.

3. A composition according to claim 1, characterized in that the polymer or copolymer of ethylene is selected from low density polyethylene, a copolymer of ethylene and a vinyl carboxylate ester or a copolymer of ethylene with an alkyl ester of an unsaturated carboxylic acid obtained by polymerisation under high pressure and at high temperature, by means of a radical-forming catalyst, or from linear low density polyethylene obtained by the copolymerisation of ethylene and at least one other alpha-olefin, by means of a Ziegler type catalyst system or a Phillips type catalyst.

4. A composition according to claim 1, characterised in that the cling agent is a polybutene or polyisobutene have a number average molecular weight in the range 700 and 5000.

5. A composition according to claim 1, characterised in that the cling agent is atactic polypropylene having a weight average molecular weight in the range 1000 and 10000.

6. A composition according to claim 1, characterized in that the crystalline wax is selected from microcrystalline waxes obtained by Fischer-Tropsch synthesis, having a number average molecular weight in the range 400 and 1000, waxes of high density polyethylene or of low density polyethylene, obtained by direct polymerisation or by degradation of polyethylene of high molecular weight, these polyethylene waxes having a number average molecular weight in the range 300 and 15000, hydrogenated castor oil waxes or waxes consisting of aliphatic amides of high molecular weight.

7. Stretchable cling film characterised in that it is obtained by extrusion-blowing or cast-extrusion from a composition according to any one of claims 1 to 5.

* * * * *

UNITED STATES PATENT AND TRADEMARK OFFICE
CERTIFICATE OF CORRECTION

PATENT NO. : 4,680,330

DATED : July 14, 1987

INVENTOR(S) : Bernard Berrier et al

It is certified that error appears in the above-identified patent and that said Letters Patent is hereby corrected as shown below:

Col. 3, line 3, "active" should read -- activated --

Col. 5, line 45, "may" should read -- may be --

Signed and Sealed this

First Day of December, 1987

Attest:

DONALD J. QUIGG

Attesting Officer      Commissioner of Patents and Trademarks